US012682650B2

(12) United States Patent
  Tanaka

(10) Patent No.:  US 12,682,650 B2
(45) Date of Patent:  Jul. 14, 2026

(54) DATA COLLECTING DEVICE, METHOD, COMPUTER PROGRAM, AND DATA COLLECTING SYSTEM FOR COLLECTING DATA

(71) Applicant: Woven by Toyota, Inc., Tokyo (JP)

(72) Inventor: Masahiro Tanaka, Tokyo-to (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 149 days.

(21) Appl. No.: 18/595,888

(22) Filed: Mar. 5, 2024

(65) Prior Publication Data
  US 2024/0331397 A1    Oct. 3, 2024

(30) Foreign Application Priority Data
  Mar. 28, 2023    (JP) ................................. 2023-052039

(51) Int. Cl.
  *G06V 20/56*      (2022.01)
  *G06V 10/44*      (2022.01)
(52) U.S. Cl.
  CPC .............. *G06V 20/56* (2022.01); *G06V 10/44* (2022.01)
(58) Field of Classification Search
  None
  See application file for complete search history.

(56) References Cited

U.S. PATENT DOCUMENTS

| | | | |
|---|---|---|---|
| 2019/0376809 A1* | 12/2019 | Hanniel | ................. G05D 1/028 |
| 2021/0180963 A1 | 6/2021 | Nomura | |
| 2021/0180981 A1 | 6/2021 | Matsumoto et al. | |
| 2021/0180982 A1* | 6/2021 | Watanabe | ......... G01C 21/3815 |
| 2021/0231457 A1* | 7/2021 | Neyama | ................ H04W 4/025 |

FOREIGN PATENT DOCUMENTS

| | | |
|---|---|---|
| JP | 2020-035321 A | 3/2020 |
| JP | 2020-038362 A | 3/2020 |

* cited by examiner

*Primary Examiner* — Rebecca A Volentine
(74) *Attorney, Agent, or Firm* — Sughrue Mion, PLLC

(57)      ABSTRACT

A data collecting device includes a processor configured to detect a predetermined feature in an area around a vehicle during travel of the vehicle from an image representing the area around the vehicle generated by a camera mounted on the vehicle, generate probe data, based on the detected feature, store the generated probe data in a memory, and transmit, upon or after entry of the vehicle into a collection target region, the probe data generated in the collection target region and an additional section traveled by the vehicle immediately before the entry or immediately after an exit of the vehicle from the collection target region as well as the image generated in the collection target region to a server via a communication device mounted on the vehicle.

8 Claims, 7 Drawing Sheets

FIG. 6

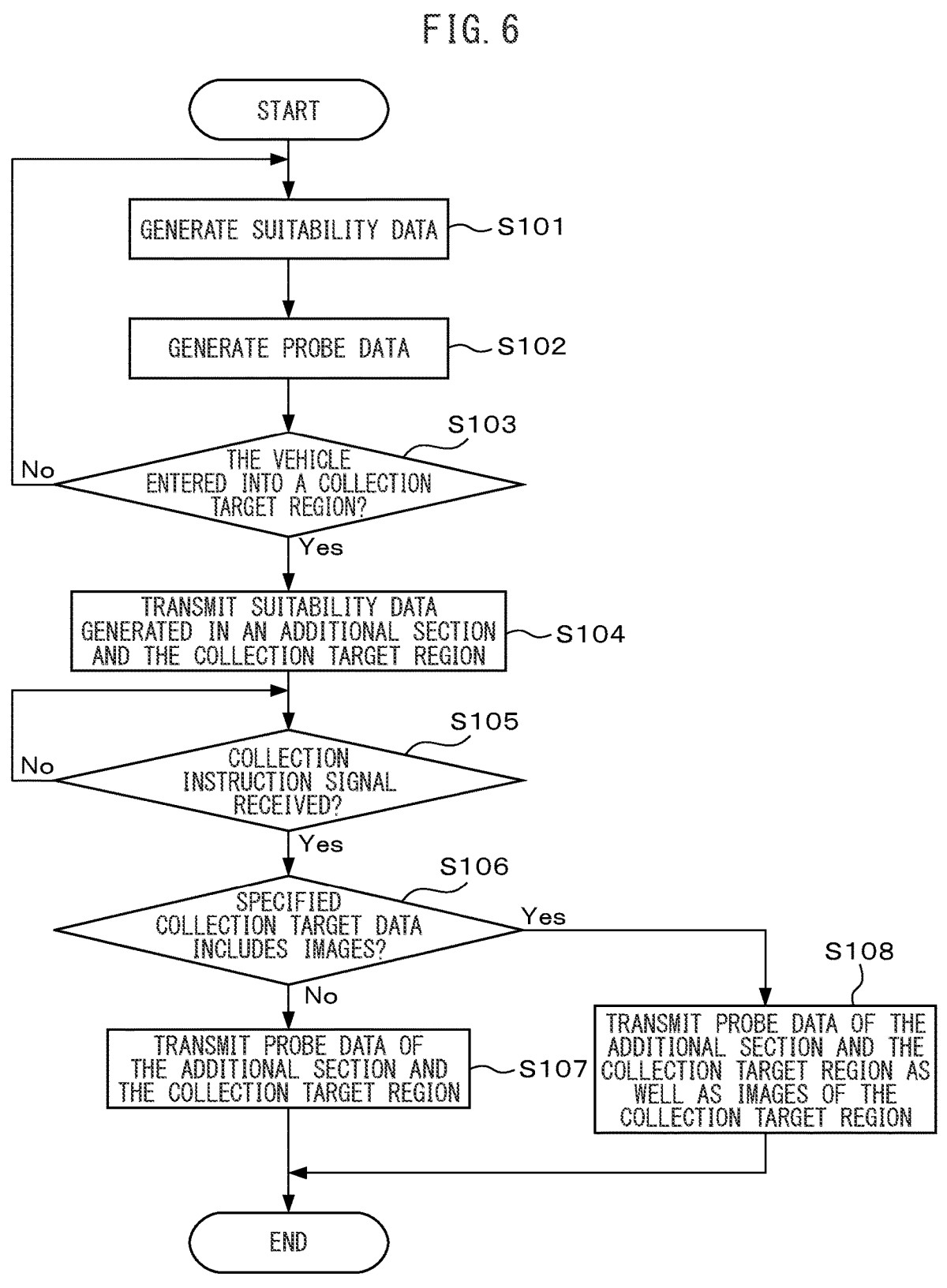

START

GENERATE SUITABILITY DATA — S101

GENERATE PROBE DATA — S102

S103
THE VEHICLE ENTERED INTO A COLLECTION TARGET REGION?
No
Yes

TRANSMIT SUITABILITY DATA GENERATED IN AN ADDITIONAL SECTION AND THE COLLECTION TARGET REGION — S104

S105
COLLECTION INSTRUCTION SIGNAL RECEIVED?
No
Yes

S106
SPECIFIED COLLECTION TARGET DATA INCLUDES IMAGES?
Yes
No

TRANSMIT PROBE DATA OF THE ADDITIONAL SECTION AND THE COLLECTION TARGET REGION — S107

S108
TRANSMIT PROBE DATA OF THE ADDITIONAL SECTION AND THE COLLECTION TARGET REGION AS WELL AS IMAGES OF THE COLLECTION TARGET REGION

END

FIG. 7
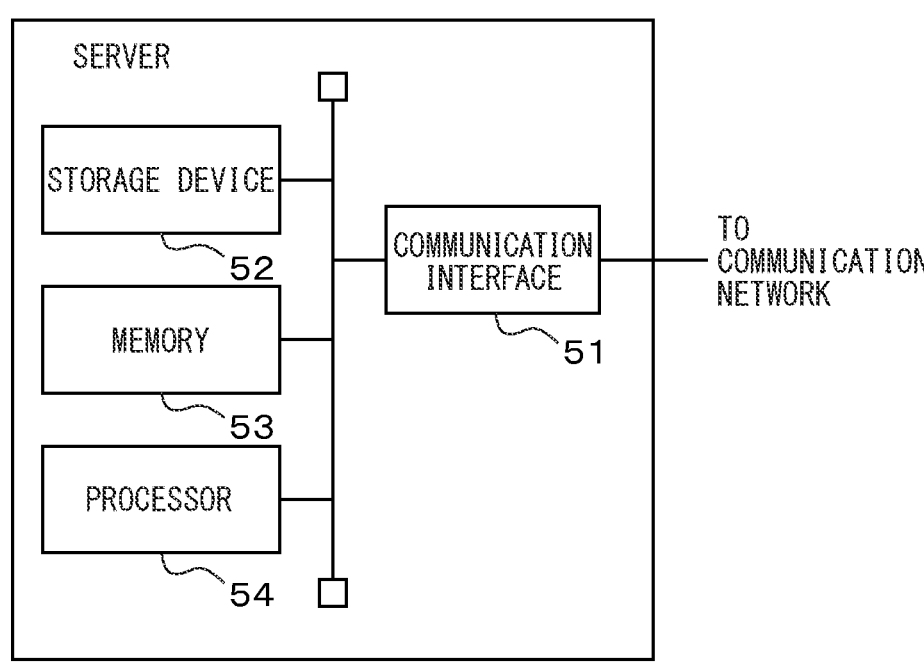
FIG. 8
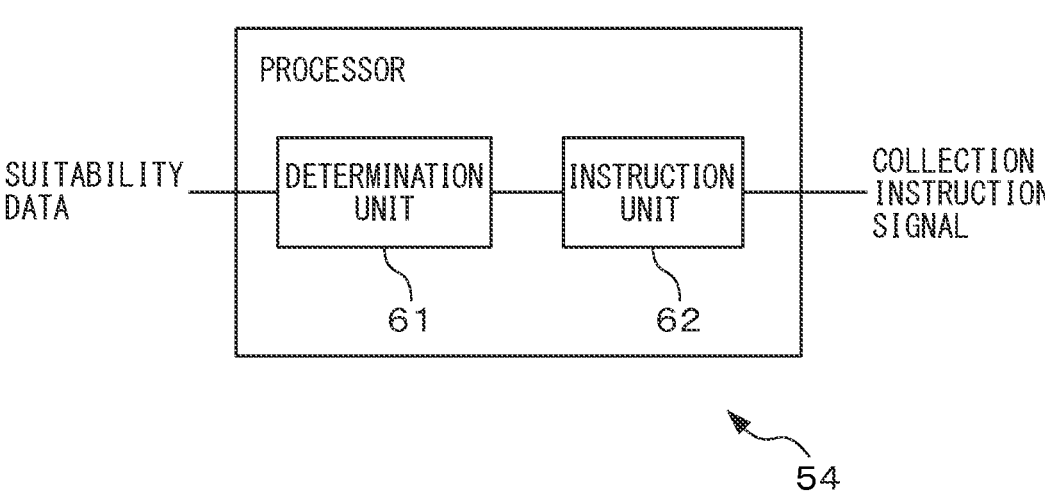

DATA COLLECTING DEVICE, METHOD, COMPUTER PROGRAM, AND DATA COLLECTING SYSTEM FOR COLLECTING DATA

FIELD

The present invention relates to a data collecting device, a method, a computer program, and a data collecting system for collecting data used for generating or updating a map.

BACKGROUND

High-precision maps to which an autonomous vehicle-driving system refers for autonomous driving control of a vehicle are required to represent information on roads accurately. Thus, from a vehicle that has actually traveled in a predetermined region, data representing features on or around a road in the predetermined region that is collected, is data that is obtained by a sensor mounted on the vehicle. However, if data is transmitted without any restriction from vehicles to a server that collects such data, the amount of communication traffic will be enormous. Thus, a technique to reduce communication traffic in collecting data detected by a vehicle has been proposed (see Japanese Unexamined Patent Publication JP2020-35321A).

In a technique disclosed in JP2020-35321A, a vehicle-mounted device detects the difference between downloaded map data and feature data recognized by a sensor, and calculates the levels of the difference and a margin. When control of travel can be executed by the vehicle-mounted device even if there is a difference, the vehicle-mounted device omits to transmit differing feature data as vehicle probe data to a center, thereby aiming at reducing communication traffic.

SUMMARY

If road sections where feature-representing data is to be collected are short, data of disjointed sections will be transmitted from vehicles to a server. This may result in data collected on the server side being insufficient. If a collection target region is set larger than a region where feature-representing data is to be actually collected, data will also be collected from a vehicle that travels through only a road section whose feature-representing data is not necessary, which increases communication traffic uselessly.

It is an object of the present invention to provide a data collecting device that can collect feature-representing data over a continuous section while preventing communication traffic from increasing.

According to an embodiment, a data collecting device is provided. The data collecting device includes a memory configured to store information indicating a collection target region of probe data representing a predetermined feature on or around a road; and a processor configured to: detect the predetermined feature in an area around a vehicle during travel of the vehicle from an image representing the area around the vehicle generated by a camera mounted on the vehicle, generate the probe data, based on the detected feature, store the generated probe data in the memory, and transmit, upon or after entry of the vehicle into the collection target region, the probe data generated in the collection target region and an additional section traveled by the vehicle immediately before the entry or immediately after an exit of the vehicle from the collection target region as well as the image generated during travel of the vehicle in the collection target region to a server via a communication device mounted on the vehicle.

The processor is preferably further configured to generate suitability data indicating suitability of the vehicle or environment around the vehicle for collecting the probe data, and store the generated suitability data in the memory. In this case, in response to entry of the vehicle into the collection target region, the processor transmits the suitability data generated during travel of the vehicle in the additional section and the suitability data generated during travel of the vehicle in the collection target region to the server via the communication device mounted on the vehicle. Only when a collection instruction is received from the server via the communication device, the processor preferably transmits the probe data generated in the collection target region and the additional section as well as the image generated during travel of the vehicle in the collection target region to the server via the communication device.

Alternatively, when the additional section is a section traveled by the vehicle immediately before the entry, the processor preferably determines a total number of the detected predetermined features while reversely tracing a route traveled by the vehicle from an entry position of the vehicle into the collection target region, and sets the route of the vehicle from a position at which the total number reaches a predetermined number to the entry position as the additional section.

Alternatively, the processor preferably sets the length of the additional section to a length received from the server via the communication device.

Alternatively, the processor preferably determines a first number of features detected in a first section traveled by the vehicle immediately before entry into the collection target region and a second number of features detected in a second section traveled by the vehicle immediately after an exit from the collection target region, and sets at least one of the first section and the second section as the additional section, based on the first number and the second number.

Alternatively, the processor preferably sets a section specified by the server via the communication device as the additional section. The specified section is a first section traveled by the vehicle immediately before entry into the collection target region or a second section traveled by the vehicle immediately after an exit from the collection target region.

According to another embodiment of the present invention, a method for collecting data is provided. The method includes detecting a predetermined feature on or around a road in an area around a vehicle during travel of the vehicle from an image representing the area around the vehicle generated by a camera mounted on the vehicle; generating probe data representing the detected feature; storing the generated probe data in a memory; and transmitting, upon or after entry of the vehicle into a collection target region of the probe data, the probe data generated in the collection target region and an additional section traveled by the vehicle immediately before the entry or immediately after an exit of the vehicle from the collection target region as well as the image generated during travel of the vehicle in the collection target region to a server via a communication device mounted on the vehicle.

According to still another embodiment of the present invention, a non-transitory recording medium that stores a computer program for collecting data is provided. The computer program includes instructions causing a processor mounted on a vehicle to execute a process including detecting a predetermined feature on or around a road in an area around the vehicle during travel of the vehicle from an image representing the area around the vehicle generated by a camera mounted on the vehicle; generating probe data representing the detected feature; storing the generated probe data in a memory; and transmitting, upon or after entry of the vehicle into a collection target region of the probe data, the probe data generated in the collection target region and an additional section traveled by the vehicle immediately before the entry or immediately after an exit of the vehicle from the collection target region as well as the image generated during travel of the vehicle in the collection target region to a server via a communication device mounted on the vehicle.

According to yet another embodiment of the present invention, a data collecting system including a data collecting device and a server communicably connected to the data collecting device is provided. In the data collecting system, the data collecting device is mounted on a vehicle, and includes a memory configured to store information indicating a collection target region of probe data representing a predetermined feature on or around a road; and a processor configured to: detect the predetermined feature in an area around the vehicle during travel of the vehicle from an image representing the area around the vehicle generated by a camera mounted on the vehicle, generate the probe data, based on the detected feature, store the generated probe data in the memory, and transmit, upon or after entry of the vehicle into the collection target region, the probe data generated in the collection target region and an additional section traveled by the vehicle immediately before the entry or immediately after an exit of the vehicle from the collection target region as well as the image generated during travel of the vehicle in the collection target region to the server via a communication device mounted on the vehicle.

The data collecting device according to the present disclosure has an advantageous effect of being able to collect feature-representing data over a continuous section while preventing communication traffic from increasing.

BRIEF DESCRIPTION OF DRAWINGS

FIG. 6 is an operation flowchart of a data collecting process.

FIG. 7 illustrates the hardware configuration of the server.

FIG. 8 is a functional block diagram of a processor of the server.

DESCRIPTION OF EMBODIMENTS

A data collecting device, a method and a computer program for collecting data executed by the data collecting device, and a data collecting system will now be described with reference to the attached drawings. The data collecting device is mounted on a vehicle, and generates that data representing a predetermined feature on or around a road which is used for generating or updating a map (hereafter "probe data"), based on an image representing an area around the vehicle. In response to entry of the vehicle into a collection target region of probe data, the data collecting device transmits suitability data, which indicates the degree of suitability for collecting probe data, generated in an additional section traveled by the vehicle immediately before the entry and suitability data generated during travel of the vehicle in the collection target region to a server via a communication device. When an instruction to collect probe data is received from the server via the communication device, the data collecting device further transmits probe data generated during travel of the vehicle in the additional section and probe data generated during travel of the vehicle in the collection target region to the server via the communication device. Further, the data collecting device also transmits an image representing the area around the vehicle generated during travel of the vehicle in the collection target region to the server.

Figure 1:
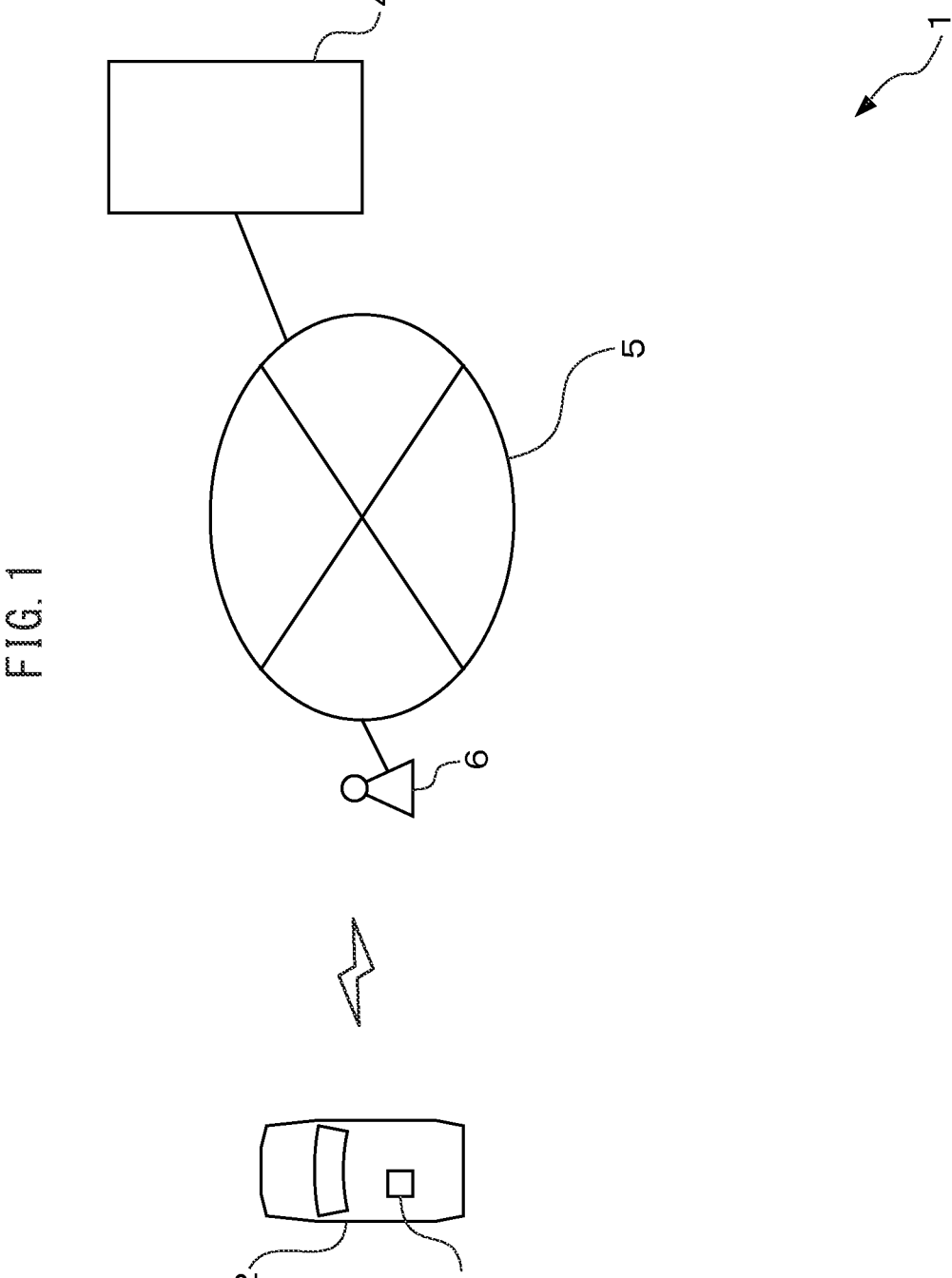
FIG. 1 schematically illustrates the configuration of a data collecting system equipped with a data collecting device.

FIG. 1 schematically illustrates the configuration of a data collecting system equipped with the data collecting device. In the present embodiment, the data collecting system 1 includes a data collecting device 3 mounted on at least one vehicle 2 as well as a server 4. The data collecting device 3 accesses a wireless base station 6, which is connected via a gateway (not illustrated) to a communication network 5 connected with the server 4, thereby connecting to the server 4 via the wireless base station 6 and the communication network 5. FIG. 1 illustrates only a single vehicle 2, but the data collecting system 1 may include multiple vehicles 2 each equipped with a data collecting device 3. Similarly, the communication network 5 may be connected with multiple wireless base stations 6.

First, the vehicle 2 and the data collecting device 3 will be described. The data collecting system 1 may include multiple vehicles 2 each equipped with a data collecting device 3 as described above, but the following describes a single vehicle 2 and a single data collecting device 3 because each vehicle 2 and each data collecting device 3 include the same configuration and execute the same processing in relation to the data collecting process.

Figure 2:
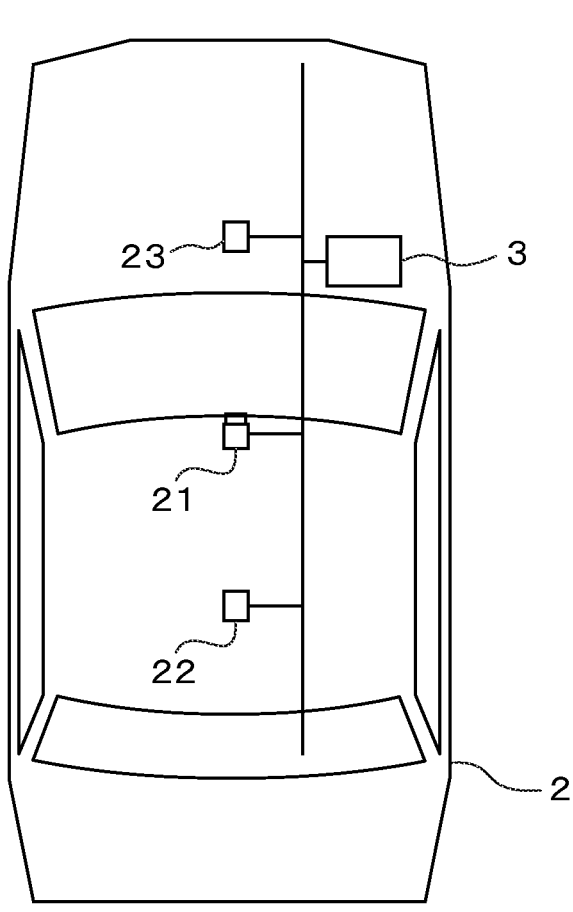
FIG. 2 schematically illustrates the configuration of a vehicle.

FIG. 2 schematically illustrates the configuration of the vehicle 2. The vehicle 2 includes a camera 21 for taking pictures of an area around the vehicle 2, a GPS receiver 22, and a wireless communication terminal 23, in addition to the data collecting device 3. The camera 21, the GPS receiver 22, the wireless communication terminal 23, and the data collecting device 3 are communicably connected via an in-vehicle network conforming to a standard such as a controller area network. The vehicle 2 may further include a range sensor (not illustrated) for measuring the distance to an object in an area around the vehicle 2, such as a LiDAR sensor.

The camera 21, which is an example of an image capturing unit, includes a two-dimensional detector constructed from an array of optoelectronic transducers, such as CCD or C-MOS, having sensitivity to visible light and a focusing optical system that forms an image of a target region on the two-dimensional detector. The camera 21 is mounted, for example, in the interior of the vehicle 2 so as to be oriented, for example, to the front of the vehicle 2. The camera 21 takes pictures of a region in front of the vehicle 2 every predetermined capturing period (e.g., $\frac{1}{30}$ to $\frac{1}{10}$ seconds), and generates images representing the region. The images obtained by the camera 21 may be color or grayscale images. The vehicle 2 may include multiple cameras 21 taking pictures in different orientations or having different focal lengths.

Every time an image is generated, the camera 21 outputs the generated image to the data collecting device 3 via the in-vehicle network.

The GPS receiver 22 receives GPS signals from GPS satellites at predetermined intervals, and determines the position of the vehicle 2, based on the received GPS signals. The GPS receiver 22 outputs positioning information indicating the result of determination of the position of the vehicle 2 based on the GPS signals to the data collecting device 3 via the in-vehicle network at predetermined intervals. Instead of the GPS receiver 22, the vehicle 2 may include a receiver conforming to another satellite positioning system. In this case, the receiver determines the position of the vehicle 2.

The wireless communication terminal 23, which is an example of the communication device, is a device to execute a wireless communication process conforming to a predetermined standard of wireless communication, and accesses, for example, the wireless base station 6 to connect to the server 4 via the wireless base station 6 and the communication network 5. The wireless communication terminal 23 receives a downlink radio signal including a collection instruction signal or a signal indicating a collection target region from the server 4, and outputs the received signal to the data collecting device 3. Further, the wireless communication terminal 23 generates an uplink radio signal including suitability data or collection target data of a specified type (e.g., probe data or an image) received from the data collecting device 3. The wireless communication terminal 23 transmits the uplink radio signal to the wireless base station 6, thereby transmitting the suitability data or the collection target data to the server 4.

Figure 3:
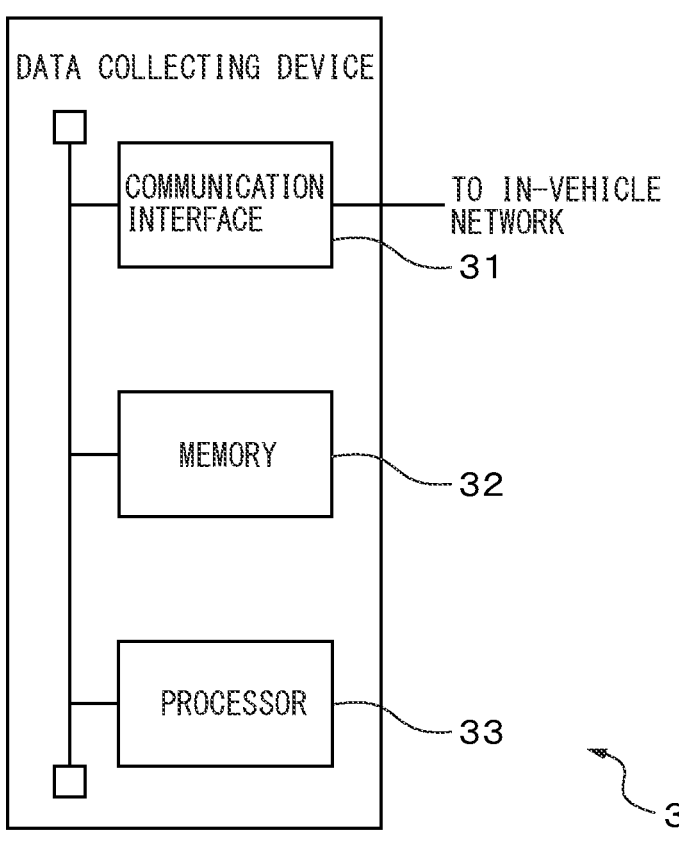
FIG. 3 illustrates the hardware configuration of the data collecting device according to an embodiment.

FIG. 3 illustrates the hardware configuration of the data collecting device 3. The data collecting device 3 temporarily stores images received from the camera 21. In addition, the data collecting device 3 generates suitability data and probe data, based on, for example, the images, and temporarily stores the generated suitability data and probe data. The data collecting device 3 transmits the suitability data, the probe data, and the images to the server 4 via the wireless communication terminal 23. To achieve this, the data collecting device 3 includes a communication interface 31, a memory 32, and a processor 33.

The communication interface 31, which is an example of an in-vehicle communication unit, includes an interface circuit for connecting the data collecting device 3 to the in-vehicle network. In other words, the communication interface 31 is connected to the camera 21, the GPS receiver 22, and the wireless communication terminal 23 via the in-vehicle network. Every time an image is received from the camera 21, the communication interface 31 passes the received image to the processor 33. Every time positioning information is received from the GPS receiver 22, the communication interface 31 passes the received positioning information to the processor 33. Every time information from the server 4, such as a collection instruction signal, is received from the wireless communication terminal 23, the communication interface 31 passes the information to the processor 33. Further, the communication interface 31 outputs data received from the processor 33, such as suitability data and collection target data, to the wireless communication terminal 23 via the in-vehicle network.

The memory 32, which is an example of the storage unit, includes, for example, volatile and nonvolatile semiconductor memories. The memory 32 may further include other storage, such as a hard disk drive. The memory 32 stores various types of data used in a process related to data collection executed by the processor 33 of the data collecting device 3. For example, the memory 32 stores identifying information of the vehicle 2, parameters of the camera 21, such as the focal length, the orientation, and the mounted position of the camera 21, images received from the camera 21, various parameters for specifying a classifier for detecting a feature from an image, and positioning information received from the GPS receiver 22. The memory 32 further stores information indicating a collection target region received from the server 4. The memory 32 may further store a computer program for implementing processes executed by the processor 33.

The processor 33 includes one or more central processing units (CPUs) and a peripheral circuit thereof. The processor 33 may further include another operating circuit, such as a logic-arithmetic unit, an arithmetic unit, or a graphics processing unit. The processor 33 stores images received from the camera 21, positioning information received from the GPS receiver 22, and other data in the memory 32. Every time an image is received from the camera 21, the processor 33 associates the position of the vehicle 2 indicated by the latest positioning information and the orientation of the vehicle 2 indicated by an orientation sensor (not illustrated) with the image. The processor 33 may also associate parameters of the camera 21, such as the focal length, the mounted position, and the orientation of the camera 21, with the image. The information associated with the images is uploaded to the server 4, together with the images, when the images are uploaded to the server 4. Further, the processor 33 executes the data collecting process during travel of the vehicle 2.

Figure 4:
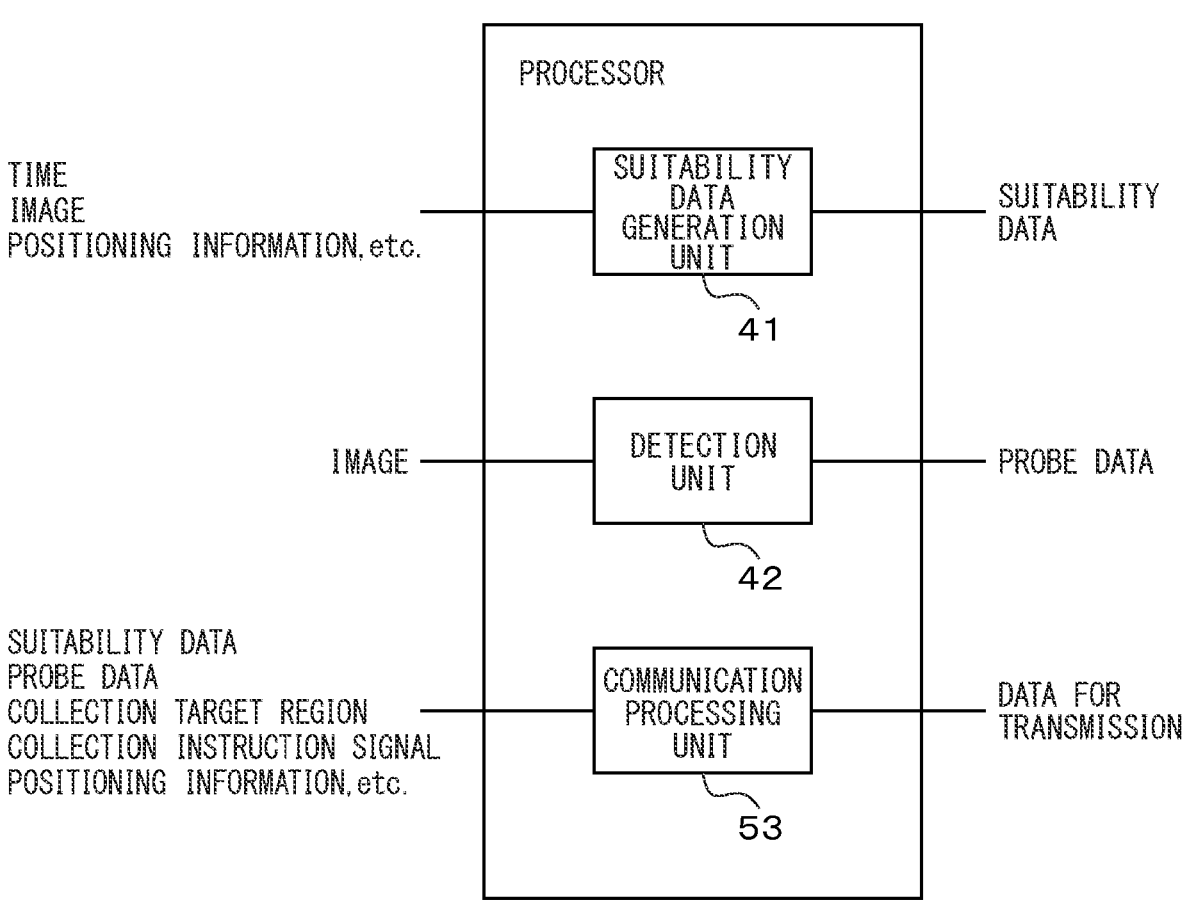
FIG. 4 is a functional block diagram of a processor of the data collecting device.

FIG. 4 is a functional block diagram of the processor 33 of the data collecting device 3. The processor 33 includes a suitability data generation unit 41, a detection unit 42, and a communication processing unit 43. These units included in the processor 33 are functional modules, for example, implemented by a computer program executed by the processor 33, or may be dedicated operating circuits provided in the processor 33.

The suitability data generation unit 41 generates suitability data, for example, every predetermined period (e.g., 10 seconds to several minutes) or every time the vehicle 2 travels a predetermined distance (e.g., 100 m to 1 km).

The suitability data generation unit 41 generates suitability data indicating suitability of the vehicle 2 or environment around the vehicle 2 for collecting collection target data. Suitability data includes, for example, at least one of a clarity index, a stillness index, a cover index, or a position index.

The clarity index indicates clarity of a road or a road feature represented in an image generated by the camera mounted on the vehicle 2. The clarity index includes, for example, at least one of the current time, control information on automatic lighting of the vehicle 2, a value sensed by an illuminance sensor mounted on the vehicle 2, information on stains of the camera mounted on the vehicle 2, or a value indicating clarity of an image. The value indicating clarity of an image is, for example, a value indicating the contrast or the luminance distribution of a region representing a road, and is obtained as a result of analysis of an image generated by the camera mounted on the vehicle 2.

The stillness index indicates whether the vehicle 2 stays still. The stillness index includes, for example, the shift position or the speed of the vehicle 2.

The cover index indicates whether a feature in an area around the vehicle 2 is covered in an image by another object (e.g., another vehicle in the area around the vehicle 2).

The cover index includes, for example, a set value of the distance between vehicles for the case where cruise control is applied to the vehicle 2, or a measurement of the distance from the vehicle 2 to another object in the area around the vehicle 2 obtained by a range sensor mounted on the vehicle 2.

The position index indicates the position of the vehicle 2 relative to a lane line.

Suitability data further includes positional information indicating the position and the travel direction of the vehicle 2 at the time of generation of the suitability data as well as identifying information of the vehicle 2. To achieve this, the suitability data generation unit 41 includes the position of the vehicle 2 indicated by the latest positioning information received from the GPS receiver 22 in suitability data as the position of the vehicle 2 at the time of generation of the suitability data. Alternatively, the suitability data generation unit 41 may include a position to which the position of the vehicle 2 indicated by the latest positioning information is corrected by referring to odometry information from the time of acquisition of the latest positioning information until the current time, in suitability data as the position of the vehicle 2 at the time of generation of the suitability data. The suitability data generation unit 41 further includes the latest travel direction of the vehicle 2 indicated by the orientation sensor (not illustrated) mounted on the vehicle 2 in the suitability data.

When including the current time in suitability data as a clarity index, the suitability data generation unit 41 obtains information indicating the current time from a timepiece (not illustrated) mounted on the vehicle 2 or from time information received via the wireless communication terminal 23. When including control information on automatic lighting of the vehicle 2 in suitability data as a clarity index, the suitability data generation unit 41 obtains the control information via the in-vehicle network from an electronic control unit (not illustrated) that controls the headlights of the vehicle 2. Similarly, when including a value sensed by the illuminance sensor (not illustrated) mounted on the vehicle 2 in suitability data as a clarity index, the suitability data generation unit 41 obtains the sensed value via the in-vehicle network from the illuminance sensor or an electronic control unit (not illustrated) that controls a windshield wiper.

When including information on stains of the camera 21 in suitability data as a clarity index, the suitability data generation unit 41 determines a value indicating the degree of blurring caused by stains of the camera 21, for example, from an image generated by the camera 21. To this end, the suitability data generation unit 41 calculates, for example, a statistically representative value of intensity of individual edges detected by applying an edge detection filter to an image as the value indicating the degree of blurring. Alternatively, the suitability data generation unit 41 may determine a value indicating the degree of stains of the camera 21 in accordance with one of various techniques for determining the degree of stains of a camera from an image. When including a value indicating clarity of an image generated by the camera 21 in suitability data as a clarity index, the suitability data generation unit 41 calculates the value indicating clarity from the image. For example, the suitability data generation unit 41 calculates the contrast of a region representing a road in the image (e.g., the ratio of the difference between the maximum and the minimum of luminances of pixels in the region to the sum of the maximum and the minimum) as the value indicating clarity. Alternatively, the suitability data generation unit 41 may calculate, for example, the minimum, maximum, or variance of luminances of pixels of the image as the value indicating clarity. More specifically, a minimum of luminance that is close to the upper limit of the range of luminance values (e.g., 0 to 255) indicates that the whole image is substantially solid white and not very clear. Similarly, a maximum of luminance that is close to the lower limit of the range of luminance values indicates that the whole image is substantially solid black and not very clear. A low variance of luminance values indicates that the whole image has substantially the same luminance and thus is not very clear.

When including the shift position of the vehicle 2 in suitability data as a stillness index, the suitability data generation unit 41 obtains information indicating the shift position via the in-vehicle network from an electronic control unit (not illustrated) that controls travel of the vehicle 2. Similarly, when including the speed of the vehicle 2 in suitability data as a stillness index, the suitability data generation unit 41 obtains a measurement of the vehicle speed via the in-vehicle network from a vehicle speed sensor (not illustrated) that measures the speed of the vehicle 2 or from the electronic control unit that controls travel of the vehicle 2.

When including a set value of the distance between vehicles for the case where cruise control is applied to the vehicle 2 in suitability data as a cover index, the suitability data generation unit 41 obtains the set value of the distance between vehicles via the in-vehicle network from the electronic control unit that controls travel of the vehicle 2. Similarly, when including a measurement of the distance from the vehicle 2 to another object in an area around the vehicle 2 in suitability data as a cover index, the suitability data generation unit 41 obtains the measurement of the distance via the in-vehicle network from the range sensor or the electronic control unit that controls travel of the vehicle 2.

When including information indicating the position of the vehicle 2 relative to a lane line in suitability data as a position index, the suitability data generation unit 41 detects a lane line, for example, from an image obtained from the camera 21. The suitability data generation unit 41 then determines whether the vehicle 2 is straddling the lane line, based on the position of the lane line in the image, and uses a flag indicating the result of the determination as the position index. The suitability data generation unit 41 can detect a lane line, for example, by inputting an image into a classifier that has been trained to detect a feature, such as a lane line, as will be described below in relation to the detection unit 42. Since the orientation of the camera 21 relative to the travel direction of the vehicle 2 is known, the area in an image that is supposed to represent a lane line straddled by the vehicle 2 is also known. Thus, such an area is prestored in the memory 32, and the suitability data generation unit 41 can determine whether the vehicle 2 is straddling a lane line, by determining whether the area includes the detected lane line.

When suitability data is generated, the suitability data generation unit 41 stores the generated suitability data in the memory 32.

The detection unit 42 detects a predetermined feature from the latest image generated by the camera 21 during travel of the vehicle 2 every predetermined period or every time the vehicle 2 travels a predetermined distance. The predetermined feature is a feature represented in a map to be generated or updated, and is, for example, one of various road markings or traffic signs, a curbstone, a guardrail, or a pole for installing traffic lights or a traffic sign. The detection unit 42 generates probe data representing the type and the position of the feature detected in the image.

For example, the detection unit 42 inputs the image into a classifier to detect a predetermined feature represented in the inputted image. As such a classifier, the detection unit 42 can use a deep neural network (DNN) having architecture of a convolutional neural network (CNN) type, such as Single Shot MultiBox Detector or Faster R-CNN. Alternatively, as such a classifier, the detection unit 42 may use a DNN having architecture of a self-attention network (SAN) type, such as Vision Transformer, or a classifier based on another machine learning technique, such as an AdaBoost classifier. Such a classifier is trained in advance with a large number of training images representing a predetermined feature that is a detection target in accordance with a predetermined training technique, such as backpropagation, so as to detect the feature from an image. The classifier outputs information indicating a region including a detection target feature in the inputted image, e.g., a circumscribed rectangle of the detection target feature (hereafter an "object region") and information indicating the type of the feature represented in the object region.

The detection unit 42 estimates the position of a feature represented in an object region detected from an image, based on the direction from the camera 21 to a position corresponding to the centroid of the object region, the position and the travel direction of the vehicle 2 at the time of generation of the image, and parameters of the camera 21, such as the orientation, the focal length, and the mounted position. The detection unit 42 generates probe data including information indicating the type and the estimated position of the detected feature. In the probe data, the detection unit 42 may further include information indicating the position and the travel direction of the vehicle 2 at the time of generation of the image, and further include information indicating the size and the position in the image of the object region. The detection unit 42 stores the generated probe data in the memory 32.

The communication processing unit 43 transmits suitability data, probe data, and images stored in the memory 32 to the server 4 via the wireless communication terminal 23.

In the present embodiment, the communication processing unit 43 determines whether the vehicle 2 has entered a collection target region, by referring to information indicating the collection target region and the latest positioning information stored in the memory 32. A collection target region is specified, for example, in units of one or more continuous road sections or a region of a predetermined shape. When a collection target region is specified as a road section, information indicating the collection target region includes identifying information for identifying the road section and information indicating the positions of ends at which the road section can be entered or exited. When a collection target region is a region of a predetermined shape, information indicating the collection target region includes information indicating the position of the outer edge of the region. When the position of the vehicle 2 indicated by the latest positioning information is included in a region or a road section indicated by information indicating a collection target region, the communication processing unit 43 determines that the vehicle 2 has entered the collection target region.

Upon or after entry of the vehicle 2 into a collection target region (i.e. in response to entry of the vehicle 2 into a collection target region), the communication processing unit 43 identifies suitability data generated during travel of the vehicle 2 in an additional section traveled immediately before entry of the vehicle 2 into the collection target region among pieces of suitability data stored in the memory 32. The additional section has a length of a predetermined distance (e.g., several kilometers) and extends along a route traveled by the vehicle 2. Thus, when routes of multiple vehicles 2 differ, their additional sections also differ even if the vehicles 2 enter a collection target region from the same position. By referring to positional information of the vehicle 2 included in suitability data, the communication processing unit 43 identifies a piece of suitability data generated within the predetermined distance of the position of the vehicle 2 at entry of the vehicle 2 into the collection target region, as one generated in the additional section.

In addition, the communication processing unit 43 identifies suitability data generated from entry of the vehicle 2 into the collection target region until an exit from the collection target region, as suitability data generated during travel of the vehicle 2 in the collection target region. To this end, the communication processing unit 43 determines that the vehicle 2 has exited from the collection target region, when the position of the vehicle 2 indicated by the latest positioning information is outside a region or a road section indicated by the information indicating the collection target region.

The communication processing unit 43 outputs suitability data generated during travel of the vehicle 2 in the additional section and suitability data generated during travel of the vehicle 2 in the collection target region to the wireless communication terminal 23 via the communication interface 31. In this way, the communication processing unit 43 transmits these pieces of suitability data to the server 4 via the wireless base station 6 and the communication network 5.

When a collection instruction signal is received from the server 4 via the wireless communication terminal 23 after transmission of suitability data from the data collecting device 3 to the server 4, the communication processing unit 43 transmits data specified in the collection instruction signal to the server 4 via the wireless communication terminal 23.

More specifically, when probe data is specified in the collection instruction signal as collection target data, the communication processing unit 43 identifies probe data generated during travel of the vehicle 2 in the collection target region among pieces of probe data stored in the memory 32. In addition, the communication processing unit 43 identifies probe data generated during travel of the vehicle 2 in the additional section. Specifically, the communication processing unit 43 identifies these pieces of probe data by referring to information indicating the position of the vehicle 2 included in probe data, similarly to the identification of suitability data.

The communication processing unit 43 outputs probe data generated during travel of the vehicle 2 in the additional section and probe data generated during travel of the vehicle 2 in the collection target region to the wireless communication terminal 23 via the communication interface 31. In this way, probe data generated in the section whose suitability data is transmitted to the server 4 is uploaded to the server 4.

When probe data and images are specified in the collection instruction signal as collection target data, the communication processing unit 43 identifies probe data generated during travel of the vehicle 2 in the additional section and probe data generated during travel of the vehicle 2 in the collection target region, as described above. In addition, the communication processing unit 43 identifies images generated by the camera 21 during travel of the vehicle 2 in the collection target region among the images stored in the memory 32. Specifically, the communication processing unit 43 identifies images generated by the camera 21 during travel of the vehicle 2 in the collection target region, by referring to information indicating the position of the vehicle 2 associated with the images, similarly to the identification of suitability data.

The communication processing unit 43 outputs probe data generated during travel of the vehicle 2 in the additional section as well as probe data and images generated during travel of the vehicle 2 in the collection target region to the wireless communication terminal 23 via the communication interface 31. Thus, regarding probe data, of which the amount of data is relatively small, pieces thereof generated in both the additional section and the collection target region are uploaded to the server 4. In contrast, regarding images, of which the amount of data is relatively large, only ones generated in the collection target region are uploaded to the server 4. Thus the communication processing unit 43 can upload data necessary for generating or updating a map to the server 4 while reducing communication traffic.

An image specified in a collection instruction signal may be a sub-image. In this case, for each image generated in the collection target region, the communication processing unit 43 cuts out an area assumed to represent a road surface from the image to generate a sub-image. The communication processing unit 43 outputs probe data generated during travel of the vehicle 2 in the additional section as well as probe data and sub-images generated during travel of the vehicle 2 in the collection target region to the wireless communication terminal 23 via the communication interface 31.

Figure 5:
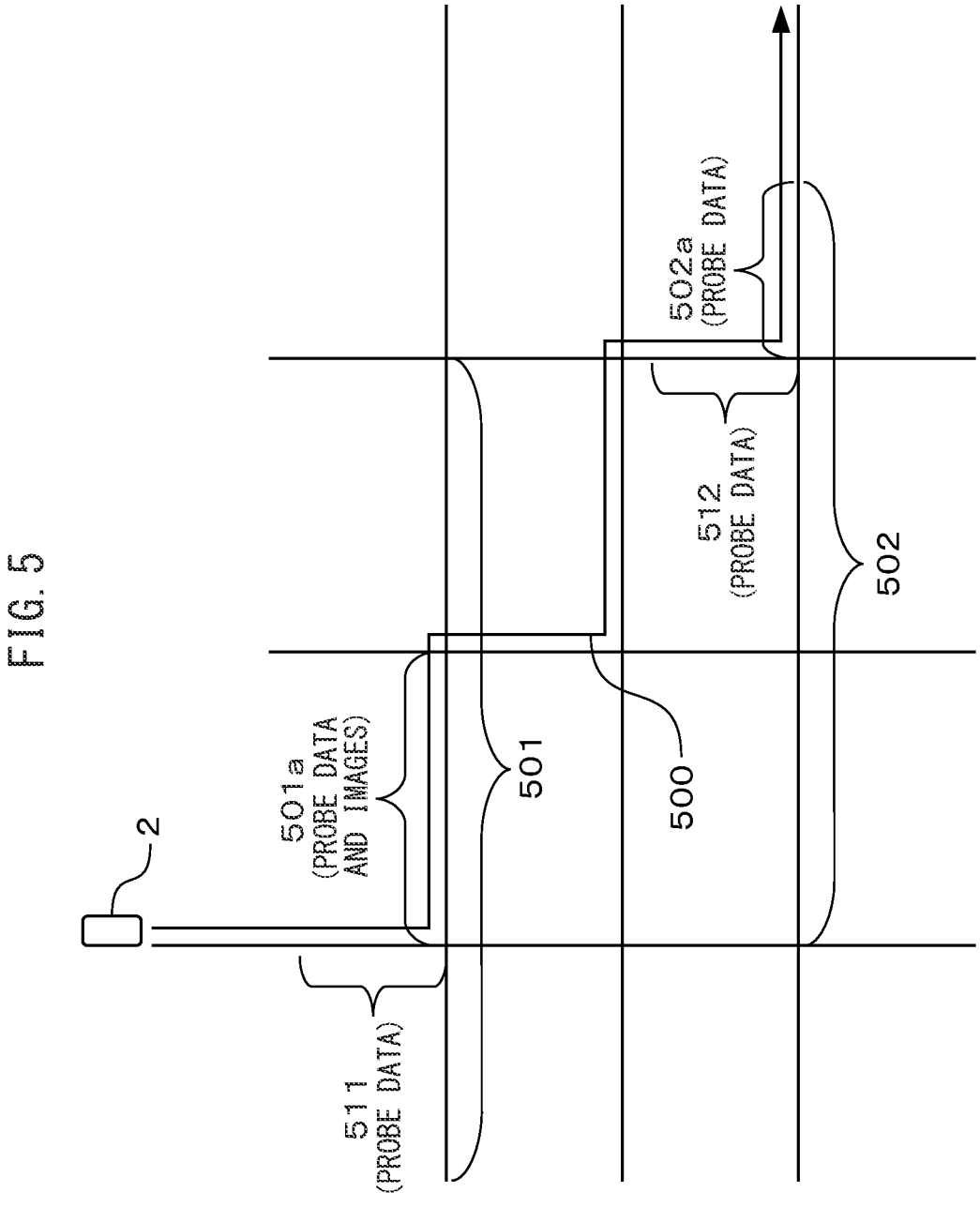
FIG. 5 illustrates an example of the relationship between a route traveled by the vehicle and data uploaded to a server.

FIG. 5 illustrates an example of the relationship between a route traveled by the vehicle 2 and data uploaded to the server 4. In FIG. 5, assume that the vehicle 2 travels along a trajectory 500, and that, of individual road sections illustrated in FIG. 5, road sections 501 and 502 are collection target regions.

In response to entry of the vehicle 2 into the road section 501, which is one of the collection target regions, suitability data generated in a section 501*a* traveled by the vehicle 2 in the road section 501 and suitability data generated in a section 511 traveled before the entry are transmitted to the server 4. In this example, assume that an instruction to collect probe data and images of the road section 501 is given by the server 4. Thus, probe data generated in the sections 511 and 501*a* and images generated in the section 501*a* are uploaded to the server 4.

In response to entry of the vehicle 2 into the road section 502, which is the other of the collection target regions, suitability data generated in a section 502*a* traveled by the vehicle 2 in the road section 502 and suitability data generated in a section 512 traveled before the entry are transmitted to the server 4. In this example, assume that an instruction to collect only probe data of the road section 502 is given by the server 4. Thus, probe data generated in the sections 512 and 502*a* is uploaded to the server 4.

FIG. 6 is an operation flowchart of the data collecting process. The processor 33 executes the data collecting process in accordance with the operation flowchart described below.

The suitability data generation unit 41 of the processor 33 generates suitability data every predetermined period or every time the vehicle 2 travels a predetermined distance (step S101). The detection unit 42 of the processor 33 detects a predetermined feature from the latest image and generates probe data representing the detected feature every predetermined period or every time the vehicle 2 travels a predetermined distance (step S102).

The communication processing unit 43 of the processor 33 determines whether the vehicle 2 has entered a collection target region (step S103). When the vehicle 2 has not entered a collection target region (No in step S103), the processor 33 repeats the processing of step S101 and the subsequent steps.

When the vehicle 2 enters a collection target region (Yes in step S103), the communication processing unit 43 transmits suitability data generated in the collection target region and an additional section traveled before the entry to the server 4 via the wireless communication terminal 23 (step S104).

Thereafter, the communication processing unit 43 determines whether the data collecting device 3 has received a collection instruction signal from the server 4 via the wireless communication terminal 23 (step S105). When the data collecting device 3 has not received a collection instruction signal (No in step S105), the processor 33 repeats the processing of step S105.

When the data collecting device 3 receives a collection instruction signal (Yes in step S105), the communication processing unit 43 determines whether collection target data specified in the collection instruction signal includes images besides probe data (step S106). When images are not specified as collection target data (No in step S106), only probe data is specified as collection target data. Thus, in this case, the communication processing unit 43 transmits probe data generated in the additional section and the collection target region to the server 4 via the wireless communication terminal 23 (step S107).

When images are specified as collection target data (Yes in step S106), the communication processing unit 43 transmits probe data generated in the additional section and the collection target region as well as images generated in the collection target region to the server 4 via the wireless communication terminal 23 (step S108). After step S107 or S108, the processor 33 terminates the data collecting process. When no collection instruction signal is received even after a certain period from the transmission of suitability data, the processor 33 may terminate the data collecting process without transmitting probe data and images to the server 4. In this case, when the storage area of the memory 32 becomes full, the processor 33 may overwrite the storage area with newly generated probe data and images to delete suitability data and probe data generated in the additional section and the collection target region from the memory 32.

The following describes the server 4. The server 4 stores probe data or images transmitted from the data collecting devices 3 mounted on the respective vehicles 2. Based on the probe data or the images, the server 4 generates or updates a map of a collection target region. In addition, the server 4 notifies the individual vehicles 2 of a collection target region. In addition, the server 4 specifies the type of data to be collected for the collection target region, based on received suitability data, and transmits a collection instruction signal indicating data of the specified type as collection target data to a vehicle 2 that has transmitted the suitability data.

FIG. 7 illustrates the hardware configuration of the server 4. The server 4 includes a communication interface 51, a storage device 52, a memory 53, and a processor 54. The communication interface 51, the storage device 52, and the memory 53 are connected to the processor 54 via a signal line. The server 4 may further include an input device, such as a keyboard and a mouse, and a display device, such as a liquid crystal display.

The communication interface 51, which is an example of a communication unit, includes an interface circuit for connecting the server 4 to the communication network 5. The communication interface 51 is configured to be communicable with the data collecting devices 3 mounted on the respective vehicles 2, via the communication network 5 and the wireless base station 6. More specifically, the communication interface 51 passes, to the processor 54, suitability data, collection target data, and other data received from the data collecting devices 3 of the respective vehicles 2 via the wireless base station 6 and the communication network 5. The communication interface 51 transmits a collection instruction signal received from the processor 54 and other signals to the data collecting devices 3 of the respective vehicles 2 via the communication network 5 and the wireless base station 6.

The storage device 52, which is an example of a storage unit, includes, for example, a hard disk drive, or an optical medium and an access device therefor. The storage device 52 stores type-specifying information, collection target data collected for each of road sections, and other data. The storage device 52 may further store identifying information of the individual vehicles 2, a computer program executed by the processor 54 for executing a data collecting process on the server 4 side, and a map to be generated or updated based on collection target data.

The memory 53, which is another example of a storage unit, includes, for example, nonvolatile and volatile semiconductor memories. The memory 53 temporarily stores various types of data generated during execution of the data collecting process, and various types of data obtained by communication with the individual vehicles 2, such as suitability data.

The processor 54, which is an example of a control unit, includes one or more central processing units (CPUs) and a peripheral circuit thereof. The processor 54 may further include another operating circuit, such as a logic-arithmetic unit or an arithmetic unit. The processor 54 executes the data collecting process on the server 4 side.

FIG. 8 is a functional block diagram of the processor 54, related to the data collecting process on the server 4 side. The processor 54 includes a determination unit 61 and an instruction unit 62. These units included in the processor 54 are functional modules, for example, implemented by a computer program executed by the processor 54, or may be dedicated operating circuits provided in the processor 54.

Every time the server 4 receives suitability data from the data collecting device 3 of one of the vehicles 2, the determination unit 61 determines whether the current state of the vehicle 2 is suitable for collecting collection target data, based on the suitability data. In the present embodiment, the determination unit 61 determines whether the current state of the vehicle 2 is suitable for collecting collection target data, regarding suitability data generated in a collection target region and suitability data generated in an additional section. The following describes processing on a single piece of suitability data because the determination unit 61 executes the same processing on each piece of suitability data.

For example, in the case where the suitability data includes a clarity index, the determination unit 61 determines that the current state of the vehicle 2 is suitable for collecting collection target data, only when the clarity index indicates that a road or a road feature is clear in an image generated by the camera mounted on the vehicle 2. This prevents the vehicle 2 from transmitting, to the server 4, collection target data in which it is difficult to recognize a feature to be represented on a map.

More specifically, in the case where the clarity index is the current time, when the current time corresponds to daytime, the determination unit 61 determines that the road or the road feature in the image is clear. When the current time corresponds to nighttime, the determination unit 61 determines that the road or the road feature in the image is unclear. Alternatively, when the current time corresponds to sunrise or sunset and the vehicle 2 is traveling toward the sun, the determination unit 61 may determine that the road or the road feature in the image is clear. In the case where the clarity index is control information on automatic lighting of the vehicle 2, when the control information indicates that the headlights of the vehicle 2 are turned off, the determination unit 61 determines that the road or the road feature in the image is clear. When the control information indicates that the headlights of the vehicle 2 are turned on, the determination unit 61 determines that the road or the road feature in the image is unclear. In the case where the clarity index is a value sensed by the illuminance sensor mounted on the vehicle 2, when the sensed value is greater than a predetermined illuminance threshold, the determination unit 61 determines that the road or the road feature in the image is clear. When the sensed value is not greater than the predetermined illuminance threshold, the determination unit 61 determines that the road or the road feature in the image is unclear. In the case where the clarity index is information on stains of the camera mounted on the vehicle 2, when the information indicates that the stains do not affect clarity of the image, the determination unit 61 determines that the road or the road feature in the image is clear. For example, when the degree of blurring caused by stains, which is an example of the clarity index, is not greater than a predetermined threshold, the determination unit 61 determines that the road or the road feature in the image is clear. When the information on stains indicates that the stains affect clarity of the image, the determination unit 61 determines that the road or the road feature in the image is unclear. In the case where the clarity index is a value indicating clarity of an image, when the value satisfies a clarity condition that an image is clear, the determination unit 61 determines that the road or the road feature in the image is clear. When the value does not satisfy the clarity condition, the determination unit 61 determines that the road or the road feature in the image is unclear. In the case where the value indicating clarity of an image is the maximum of contrast, variance, or luminance, when the value is not less than a predetermined threshold, it is determined that the clarity condition is satisfied. In the case where the value indicating clarity of an image is the minimum of luminance, when the value is not greater than a predetermined threshold, it is determined that the clarity condition is satisfied.

In the case where the suitability data includes a stillness index, the determination unit 61 determines that the current state of the vehicle 2 is suitable for collecting collection target data, only when the stillness index indicates that the vehicle 2 is moving. This prevents the vehicle 2 from transmitting, to the server 4, pieces of collection target data representing the same feature. More specifically, in the case where the stillness index is the shift position of the vehicle 2, when the shift position is neither parking nor neutral, the determination unit 61 determines that the vehicle 2 is moving. When the shift position is parking or neutral, the determination unit 61 determines that the vehicle 2 stays still. In the case where the stillness index is the speed of the vehicle 2, when the vehicle speed is greater than a predetermined speed threshold (e.g., 5 to 10 km/h), the determination unit 61 determines that the vehicle 2 is moving. When the vehicle speed is not greater than the predetermined speed threshold, the determination unit 61 determines that the vehicle 2 stays still.

In the case where the suitability data includes a cover index, the determination unit 61 determines that the current state of the vehicle 2 is suitable for collecting collection target data, only when the cover index indicates that a feature in an area around the vehicle 2 (e.g., a road marking, a signpost, or traffic lights) is not covered in an image. This prevents the vehicle 2 from transmitting, to the server 4, collection target data in which a feature to be represented on a map is not represented.

More specifically, in the case where the cover index is a set value of the distance between vehicles for the case where cruise control is applied to the vehicle 2, when the set value of the distance between vehicles is greater than a predetermined distance threshold (e.g., 50 to 100 m), the determination unit 61 determines that the feature in the area around the vehicle 2 is not covered. When the set value of the distance between vehicles is not greater than the predetermined distance threshold, the determination unit 61 determines that the feature in the area around the vehicle 2 is covered. In the case where the cover index is a measurement of the distance from the vehicle 2 to another object in an area around the vehicle 2 obtained by the range sensor mounted on the vehicle 2, when the measurement of the distance is greater than a predetermined distance threshold, the determination unit 61 determines that the feature in the area around the vehicle 2 is not covered. When the measurement of the distance is not greater than the predetermined distance threshold, the determination unit 61 determines that the feature in the area around the vehicle 2 is covered.

In the case where the suitability data includes a position index, the determination unit 61 determines that the current state of the vehicle 2 is suitable for collecting collection target data, only when the position index indicates that the vehicle 2 is at a position suitable for collecting collection target data. More specifically, in the case where the position index is information indicating the position of the vehicle 2 relative to a lane line, for example, when the information indicates that the vehicle 2 is not straddling the lane line, the determination unit 61 determines that the current state of the vehicle 2 is suitable for collecting collection target data. This prevents the vehicle 2 from transmitting, to the server 4, collection target data representing a feature differently from a normal case (e.g., a case where the vehicle 2 is traveling along a lane).

Suitability data may include multiple clarity indices. In this case, the determination unit 61 may determine that the current state of the vehicle 2 is suitable for collecting collection target data, only when every clarity index indicates that a road or a road feature in an image is clear. Similarly, suitability data may include multiple stillness indices. In this case, the determination unit 61 may determine that the current state of the vehicle 2 is suitable for collecting collection target data, only when every stillness index indicates that the vehicle 2 is moving. In addition, suitability data may include multiple cover indices. In this case, the determination unit 61 may determine that the current state of the vehicle 2 is suitable for collecting collection target data, only when every cover index indicates that a feature in an area around the vehicle 2 is not covered in an image. Further, suitability data may include two or more of a clarity index, a stillness index, a cover index, and a position index. In this case, the determination unit 61 may determine that the current state of the vehicle 2 is suitable for collecting collection target data, only when each of the two or more indices indicates that the current state of the vehicle 2 is suitable for collecting collection target data. When any of the two or more indices indicates that the current state of the vehicle 2 is unsuitable for collecting collection target data, the determination unit 61 may determine that the current state of the vehicle 2 is unsuitable for collecting collection target data.

In some cases, multiple pieces of suitability data are generated in a collection target region. In these cases, the determination unit 61 determines that the current state of the vehicle 2 is suitable for collecting collection target data in the collection target region, when it is determined that the current state of the vehicle 2 is suitable for collecting collection target data, regarding at least a predetermined percentage (e.g., 50% to 80%) of these pieces of suitability data. Similarly, in the case where multiple pieces of suitability data are generated in an additional section, the determination unit 61 determines that the current state of the vehicle 2 is suitable for collecting collection target data in the additional section, when it is determined that the current state of the vehicle 2 is suitable for collecting collection target data, regarding at least the predetermined percentage of these pieces of suitability data.

The determination unit 61 notifies the instruction unit 62 of the result of determination whether the current state of the vehicle 2 is suitable for collecting collection target data, regarding suitability data generated in the collection target region and the additional section.

The instruction unit 62 generates a collection instruction signal to instruct the vehicle 2 to collect collection target data, when it is determined by the determination unit 61 that the current state of the vehicle 2 is suitable for collecting collection target data in both the collection target region and the additional section.

The instruction unit 62 identifies the collection target region including the position of the vehicle 2 indicated by the suitability data, and refers to type-specifying information corresponding to the identified collection target region. Based on the type-specifying information, the instruction unit 62 identifies the type of collection target data specified for the collection target region. Examples of the type of collection target data include an image representing environment around the vehicle 2 generated by the camera 21 mounted on the vehicle 2, a sub-image of a road surface cut out from the image, and probe data representing a feature detected from the image. Thus, for each collection target region, the type-specifying information indicates an image, a sub-image, or probe data, as the type of collection target data.

The instruction unit 62 includes information specifying the identified type of collection target data in the collection instruction signal. When the type-specifying information indicates probe data, the instruction unit 62 specifies only probe data as collection target data. When the type-specifying information indicates an image, the instruction unit 62 specifies probe data and images as collection target data. When the type-specifying information indicates a sub-image, the instruction unit 62 specifies probe data and sub-images as collection target data.

The instruction unit 62 transmits the generated collection instruction signal to the vehicle 2 identified by identifying information received with the suitability data, via the communication interface 51, the communication network 5, and the wireless base station 6.

The processor 54 may set a collection target region, based on the number of pieces of probe data collected for individual road sections stored in the storage device 52. For example, the processor 54 sets a road section where the number of pieces of probe data collected in a most recent predetermined period (e.g., several weeks to several months) is less than a predetermined collection threshold, as a collection target region. Alternatively, of individual road sections represented in a map to be updated, the processor 54 may set a road section such that the time elapsed since the last update is not less than a predetermined elapsed time threshold, as a collection target region. The processor 54 then notifies the data collecting devices 3 of the respective vehicles 2 of the set collection target region via the communication interface 51.

In addition, the processor 54 may generate or update a map, using the collected probe data and images. In this case, the processor 54 executes registration between features represented in each piece of probe data collected for a continuous section by a single vehicle 2 and corresponding features represented in previously collected probe data or in the map to be updated. Of the features represented in each piece of probe data collected for the continuous section, the processor 54 identifies one that does not have a corresponding feature in the previously collected probe data or the map to be updated, as a newly installed feature. The processor 54 adds information on the identified feature (position and type) to the map to be generated or updated. Of the features represented in the map to be updated, the processor 54 may identify one that does not have a corresponding feature among the features represented in each piece of probe data collected for the continuous section, as a removed one. The processor 54 may delete information on the feature identified as a removed one, from the map to be updated.

As has been described above, the data collecting device transmits probe data generated during travel of a vehicle in a collection target region and an additional section traveled by the vehicle immediately before the collection target region to a server via a communication device. The data collecting device also transmits an image representing an area around the vehicle generated during travel of the vehicle in the collection target region to the server via the communication device. In this way, the data collecting device can collect probe data of a continuous section of a certain length and transmit the probe data to the server, even when the collection target region is small. Thus the server can accurately execute registration between a feature represented in the collected probe data and a corresponding feature represented in a map to be updated or separately collected probe data. Since the server can accurately execute registration of features represented in the collected probe data, the server can accurately estimate the position of a feature detected by the server from an image generated in the collection target region. Thus, even when a road section where information on a feature needs to be actually collected is short, it is not necessary to set a large collection target region. This prevents transmission of probe data and images to the server from a vehicle that has traveled through only a road section where information on a feature need not be actually collected. As a result, the data collecting device can prevent communication traffic from increasing.

In some cases, a route from a position where the ignition switch of the vehicle 2 is turned on to a point of entry of the vehicle 2 into a collection target region is shorter than the additional section. According to a modified example, in such cases, the communication processing unit 43 transmits suitability data and probe data generated in the route from the position where the ignition switch of the vehicle 2 is turned on to the point of entry of the vehicle 2 into a collection target region, to the server 4 via the wireless communication terminal 23. In other words, the route from the position where the ignition switch of the vehicle 2 is turned on to the point of entry of the vehicle 2 into a collection target region is set as the additional section.

Further, the length of the additional section may be specified by the server 4. In this case, the server 4 also notifies the data collecting devices 3 of the respective vehicles 2 of the length of an additional section, together with a collection target region. For example, the server 4 sets a longer additional section as the vehicle 2 travels a shorter distance in a collection target region.

The accuracy of registration of features on the server 4 side is improved as the number of detected features increases. Thus the communication processing unit 43 may determine a total number of detected features by referring to probe data while reversely tracing the route of the vehicle 2 from an entry position of entry of the vehicle 2 into a collection target region, and set an additional section, based on the total number. In this case, the communication processing unit 43 determines the route of the vehicle 2 from a position at which the total number of features reaches a predetermined number to the entry position as the additional section. According to this modified example, since the communication processing unit 43 sets an additional section, based on the number of detected features, the data collecting device 3 can set an additional section of an appropriate length so as to reduce communication traffic while ensuring the accuracy of registration of features by the server 4.

There may be a difference in use for registration between a linear feature, such as a lane line, and a point-like feature, such as a pole or traffic lights. Thus the communication processing unit 43 may calculate the total number for each type of feature or each group of types of features depending on uses for registration. In addition, the predetermined number may be set for each type of feature or each group. Then the communication processing unit 43 may determine the route of the vehicle 2 from a position at which the total numbers of respective types or respective groups reach corresponding predetermined numbers to an entry position, as an additional section.

According to the above-described modified example, the communication processing unit 43 may also add the number of features detected during travel of the vehicle 2 in the collection target region to the total number. In this case also, the data collecting device 3 can have the same advantageous effect as that in the above-described modified example.

According to another modified example, the additional section may be a section having a length of a predetermined distance traveled by the vehicle 2 after an exit of the vehicle 2 from a collection target region. In this case, the communication processing unit 43 transmits suitability data to the server 4 via the wireless communication terminal 23 after the vehicle 2 finishes traveling through the additional section. In this modified example also, the data collecting device 3 can have the same advantageous effect as that in the embodiment.

In addition, even when the additional section is set as a section traveled after an exit from a collection target region, the server 4 may notify the length of the additional section to the data collecting devices 3 of the respective vehicles 2. Alternatively, the communication processing unit 43 may determine the total number of features detected along the route of the vehicle 2 from the point at which the vehicle 2 exits from the collection target region. The communication processing unit 43 may also add the number of features detected during travel of the vehicle 2 in the collection target region to the total number. Then the communication processing unit 43 may set the route up to a position at which the total number reaches a predetermined number as an additional section. In this case also, the communication processing unit 43 may determine the total number for each type of feature or each group, and set an additional section.

According to still another modified example, the communication processing unit 43 may set a section traveled by the vehicle 2 immediately before entry into a collection target region, a section traveled immediately after an exit from the collection target region, or both as an additional section according to an instruction from the server 4. In this case, the data collecting device 3 includes the number of features detected by the detection unit 42 in a first section of a predetermined distance traveled by the vehicle 2 immediately before entry into the collection target region (hereafter a "first number") in suitability data. Similarly, the data collecting device 3 includes the number of features detected by the detection unit 42 in a second section of the predetermined distance traveled by the vehicle 2 immediately after an exit from the collection target region (hereafter a "second number") in the suitability data. Alternatively, from an electronic control unit for supporting driving or autonomous driving control of the vehicle 2, the data collecting device 3 may receive the first and second numbers of features detected by the electronic control unit from images obtained by the camera 21, and include these numbers in suitability data. Then the communication processing unit 43 transmits suitability data generated in the first and second sections to the server 4 via the wireless communication terminal 23. The instruction unit 62 of the server 4 sets an additional section, based on the first number of features detected in the first section and the second number of features detected in the second section included in the suitability data generated in the first and second sections. For example, of the first and second sections, the instruction unit 62 sets a section where a greater number of features are detected as an additional section. Alternatively, when the sum of the first and second numbers is less than a predetermined number, the instruction unit 62 may set both the first and second sections as additional sections. Then the instruction unit 62 includes information indicating which of the first and second sections is set as an additional section, in a collection instruction signal to be transmitted to the vehicle 2 that has transmitted the suitability data. According to this modified example, the data collecting device 3 can set additional sections where probe data will be collected in front of and behind the collection target region more appropriately.

The instruction unit 62 of the server 4 may determine which of the first and second sections is to be set as an additional section, based on suitability data generated in the first section and suitability data generated in the second section. For example, the instruction unit 62 sets the first section as an additional section, in the case where suitability data generated in the first section indicates that the current state of the vehicle 2 is suitable for collecting collection target data, and where suitability data generated in the second section indicates that the current state of the vehicle 2 is unsuitable for collecting collection target data. Conversely, the instruction unit 62 sets the second section as an additional section in the case where suitability data generated in the first section indicates that the current state of the vehicle 2 is unsuitable for collecting collection target data, and where suitability data generated in the second section indicates that the current state of the vehicle 2 is suitable for collecting collection target data.

In the above-described embodiment or modified examples, the server 4 may also notify the data collecting devices 3 of the respective vehicles 2 of the type of data to be collected in a collection target region, when notification of the collection target region is given. In addition, the processor 33 of the data collecting device 3 may execute the processing of the determination unit 61 and the instruction unit 62 of the processor 54 of the server 4. Based on the result of the determination, the communication processing unit 43 may set an additional section, or determine whether to transmit probe data and images to the server 4. More specifically, only when it is determined that the current state of the vehicle 2 is suitable for collecting collection target data in the additional section and the collection target region, the communication processing unit 43 transmits collection target data of a specified type to the server 4 via the wireless communication terminal 23. Since this modified example eliminates the need for transmitting suitability data to the server 4 in advance, the data collecting device 3 can further reduce communication traffic in data collection.

As described above, those skilled in the art may make various modifications according to embodiments within the scope of the present invention.

What is claimed is:

1. A data collecting device comprising:

a memory configured to store information indicating a collection target region of probe data representing a predetermined feature on or around a road; and at least one processor configured to:

detect the predetermined feature in an area around a vehicle during travel of the vehicle from an image representing the area around the vehicle generated by a camera mounted on the vehicle, generate the probe data; based on the detected predetermined feature, store the generated probe data in the memory, and transmit, upon or after entry of the vehicle into the collection target region, the probe data generated in the collection target region and an additional section traveled by the vehicle immediately before the entry or immediately after an exit of the vehicle from the collection target region as well as the image generated during travel of the vehicle in the collection target region to a server via a communication device mounted on the vehicle, wherein when the additional section is a section traveled by the vehicle immediately before the entry, the at least one processor is further configured to:

determine a total number of the detected predetermined features while reversely tracing a route traveled by the vehicle from an entry position of the vehicle into the collection target region, and set the route from a position at which the total number reaches a predetermined number to the entry position as the additional section; or when the additional section is a section traveled by the vehicle immediately after the exit, the at least one processor is further configured to:

determine a total number of the detected predetermined features along a route traveled by the vehicle from an exit position of the vehicle from the collection target region, and set the route from the exit position to a position at which the total number reaches the predetermined number as the additional section.

2. The data collecting device according to claim 1, wherein the at least one processor is further configured to generate suitability data indicating suitability of the vehicle or environment around the vehicle for collecting the probe data, and store the generated suitability data in the memory, wherein in response to entry of the vehicle into the collection target region, the at least one processor is further configured to transmit the suitability data generated during travel of the vehicle in the additional section and the suitability data generated during travel of the vehicle in the collection target region to the server via the communication device, and only when a collection instruction is received from the server via the communication device, the at least one processor is further configured to transmit the probe data generated in the collection target region and the additional section as well as the image generated during travel of the vehicle in the collection target region to the server via the communication device.

3. The data collecting device according to claim 1, wherein the at least one processor is further configured to set a length of the additional section to a length received from the server via the communication device.

4. The data collecting device according to claim 1, wherein the at least one processor is further configured to determine a first number of features detected in a first section traveled by the vehicle immediately before the entry into the collection target region and a second number of features detected in a second section traveled by the vehicle immediately after an exit from the collection target region, and sets at least one of the first section and the second section as the additional section, based on the first number and the second number.

5. The data collecting device according to claim 1, wherein the at least one processor is further configured to set a section specified by the server via the communication device as the additional section, the specified section being a first section traveled by the vehicle immediately before the entry into the collection target region or a second section traveled by the vehicle immediately after an exit from the collection target region.

6. A method for collecting data, comprising:

detecting a predetermined feature on or around a road in an area around a vehicle during travel of the vehicle from an image representing the area around the vehicle generated by a camera mounted on the vehicle;

generating probe data representing the detected predetermined feature;

storing the generated probe data in a memory; and transmitting, upon or after entry of the vehicle into a collection target region of the probe data, the probe data generated in the collection target region and an additional section traveled by the vehicle immediately before the entry or immediately after an exit of the vehicle from the collection target region as well as the image generated during travel of the vehicle in the collection target region to a server via a communication device mounted on the vehicle, wherein when the additional section is a section traveled by the vehicle immediately before the entry, the method further comprises:

determining a total number of the detected predetermined features while reversely tracing a route traveled by the vehicle from an entry position of the vehicle into the collection target region, and setting the route from a position at which the total number reaches a predetermined number to the entry position as the additional section; or when the additional section is a section traveled by the vehicle immediately after the exit, the method further comprises:

determining a total number of the detected predetermined features along a route traveled by the vehicle from an exit position of the vehicle from the collection target region, and setting the route from the exit position to a position at which the total number reaches the predetermined number as the additional section.

7. A non-transitory recording medium that stores a computer program for collecting data, the computer program causing at least one processor mounted on a vehicle to execute a process comprising:

detecting a predetermined feature on or around a road in an area around the vehicle during travel of the vehicle from an image representing the area around the vehicle generated by a camera mounted on the vehicle;

generating probe data representing the detected predetermined feature;

storing the generated probe data in a memory; and transmitting, upon or after entry of the vehicle into a collection target region of the probe data, the probe data generated in the collection target region and an additional section traveled by the vehicle immediately before the entry or immediately after an exit of the vehicle from the collection target region as well as the image generated during travel of the vehicle in the collection target region to a server via a communication device mounted on the vehicle, wherein when the additional section is a section traveled by the vehicle immediately before the entry, the process further comprises:

determining a total number of the detected predetermined features while reversely tracing a route traveled by the vehicle from an entry position of the vehicle into the collection target region, and setting the route from a position at which the total number reaches a predetermined number to the entry position as the additional section; or when the additional section is a section traveled by the vehicle immediately after the exit, the process further comprises:

determining a total number of the detected predetermined features along a route traveled by the vehicle from an exit position of the vehicle from the collection target region, and setting the route from the exit position to a position at which the total number reaches the predetermined number as the additional section.

8. A data collecting system comprising a data collecting device and a server communicably connected to the data collecting device, the data collecting device being mounted on a vehicle and comprising:

a memory configured to store information indicating a collection target region of probe data representing a predetermined feature on or around a road; and at least one processor configured to:

detect the predetermined feature in an area around the vehicle during travel of the vehicle from an image representing the area around the vehicle generated by a camera mounted on the vehicle, generate the probe data; based on the detected predetermined feature, store the generated probe data in the memory, and transmit, upon or after entry of the vehicle into the collection target region, the probe data generated in the collection target region and an additional section traveled by the vehicle immediately before the entry or immediately after an exit of the vehicle from the collection target region as well as the image generated during travel of the vehicle in the collection target region to the server via a communication device mounted on the vehicle, wherein when the additional section is a section traveled by the vehicle immediately before the entry, the at least one processor is further configured to:

determine a total number of the detected predetermined features while reversely tracing a route traveled by the vehicle from an entry position of the vehicle into the collection target region, and set the route from a position at which the total number reaches a predetermined number to the entry position as the additional section; or when the additional section is a section traveled by the vehicle immediately after the exit, the at least one processor is further configured to:

determine a total number of the detected predetermined features along a route traveled by the vehicle from an exit position of the vehicle from the collection target region, and set the route from the exit position to a position at which the total number reaches the predetermined number as the additional section.

* * * * *